Jan. 30, 1951          N. ERICKSON          2,539,691
FISHING SPOON
Filed Feb. 20, 1950
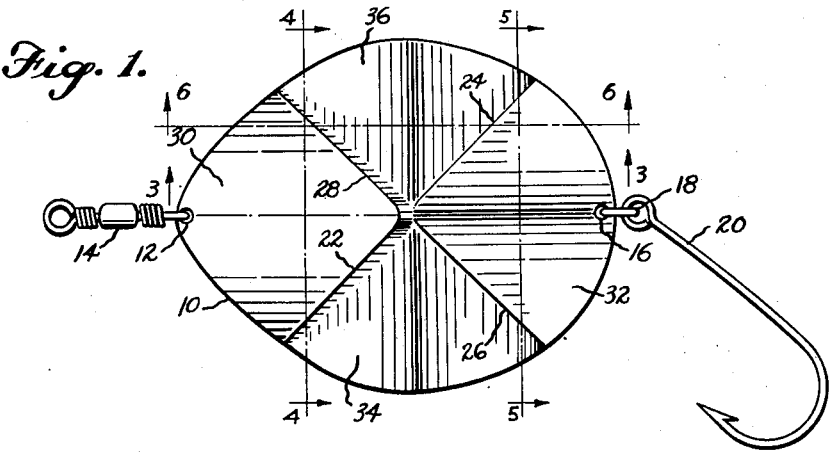
Fig. 1.
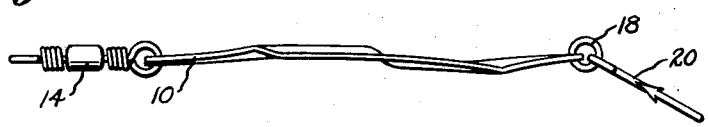
Fig. 2.
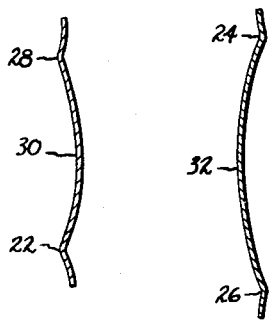
Fig. 4.
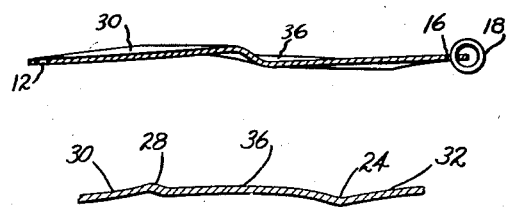
Fig. 3.
Fig. 5.      Fig. 6.
INVENTOR.
NIILO ERICKSON
BY Reynolds, Beach of
Christensen
ATTORNEY Patented Jan. 30, 1951

2,539,691

UNITED STATES PATENT OFFICE 2,539,691

FISHING SPOON

Niilo Erickson, Sointula, British Columbia, Canada

Application February 20, 1950, Serial No. 145,133

5 Claims. (Cl. 43—42.5)

This invention relates to improvements in fishing spoons and has for its general object the provision of a spoon or "wobbler," as it is descriptively named, which is especially attractive as a lure to salmon.

One of the important characteristics of the novel wobbler is its ability to oscillate or wobble rapidly through a wide angle in a manner attractive to fish and without requiring that the fishing vessel troll at any particular or critical speed.

A further object and characteristic of my improved fishing spoon is the wide angle dispersion of reflected light which it produces in intermittent flashes detectable by near-by fish, including those which are far off to the sides and behind, and below the depth of the wobbler as well as those at a lesser depth. In this connection, the spoon has a plurality of reflecting surface areas which during its oscillation scatter light through an effective angle which is greatly in excess of the oscillation magnitude of the spoon about its longitudinal axis.

Still another object is to provide a wobbler or spoon which, though made of relatively thin sheet material, will, because of its special form, be sufficiently rigid to withstand considerable abuse and rough handling without deformation. One difficulty in the past with fishing spoons made of light weight material to increase their frequency of oscillation was their inability to resist deformation caused by even the normal abuse to which fishing tackle is subjected when out of the water.

The preferred and illustrative form of my improved fishing spoon or wobbler will now be described in detail by reference to the accompanying drawings.

Figure 1 is a top view of the wobbler,

Figure 2 is a side view of the same.

Figure 3 is a longitudinal sectional view thereof taken on the line 3—3 of Figure 1.

Figure 4 is a transverse sectional view of the same taken on the line 4—4 of Figure 1.

Figure 5 is a transverse sectional view of the wobbler taken on the line 5—5 of Figure 1.

Figure 6 is a longitudinal sectional view taken on line 6—6 of Figure 1.

As shown, the spoon comprises a plate 10 of oval shape. Preferably, the leading end of the spoon has a somewhat smaller radius of curvature than its trailing end and is provided with an aperture 12 for attachment to a swivel 14 which is to be connected to the trolling line or leader. The plate's trailing end is similarly provided with an aperture 16. A connecting ring 18 passes through this aperture and the eye of the hook 20. The plate 10 is preferably of a metal such as brass or nickel, highly polished.

Four creases, 22, 24, 26 and 28 are formed in the plate 10 in such a manner as to run radially outward from its central portion to divide the plate effectively into four sectors 30, 32, 34 and 36. Preferably two of these sectors, namely, 30 and 32, extend in opposite directions longitudinally of the spoon while the other two, sectors 34 and 36, extend in opposite directions transversely thereof. The spoon is symmetrical about its longitudinal center line. Preferably the angles between the creases of the longitudinal sections are substantially the same as the angles between the creases of the transverse sectors. In the preferred and illustrated case the four creases are arranged in substantially right-angle relationship to define sectors of substantially ninety degrees each. It is important that the two creases bounding one of the longitudinal sectors form valleys while the other two creases form corresponding ridges on the same side or face of the spoon. As viewed in Figure 1 the forwardly extending creases 22 and 28 form rises or ridges whereas the rearwardly extending creases 24 and 26 form valleys or depressions in the top face.

As a further important feature the longitudinal sectors 30 and 32 are curved transversely of the plate and in opposite manner, in Figure 1 the sector 30 being concave, whereas the sector 32 is convex. Moreover, the transverse sectors 34 and 36, are curved similar to each other longitudinally of the spoon, being convex on the same face of the spoon as that on which the rear longitudinal sector 32 is likewise convex.

In the sectional views identified as Figures 4 and 5 the transverse curvature of the forward and rearward sectors 30 and 32, respectively, have been somewhat exaggerated for convenience in illustration. Actually, the amount of transverse curvature of these sectors need not be great, and the longitudinal curvature of the transverse sectors can even be slightly less.

In operation, the spoon's rear edge trails appreciably below its leading edge because of the combined weight of the spoon and the hook. The spoon normally oscillates or rocks about its inclined longitudinal axis through an angle of approximately eighty degrees. Because of the special creased and curved surface areas of the spoon, sunlight from above will be reflected in flashes at various angles within a wide angular range. As a result the spoon will attract fish not only above it but also those well off to the sides and behind at levels well below as well as above that of the spoon. A fish will see several distinct flashes of light during each cycle of oscillation of the spoon, a factor which appears to contribute materially to its effectiveness as a lure.

I claim as my invention:

1. A fishing spoon comprising a plate of oval shape adapted for attachment to a line at one end and to a hook at the opposite end, said plate having four creases radiating outward from its central portion to define four sectors, two of said sectors extending in opposite directions along the plate's longitudinal axis and the other two of said sectors extending in opposite directions transversely of the plate, the two creases bounding one of said longitudinal sectors forming valleys and the other two creases forming ridges on the same side of said plate, and said two longitudinal sectors being curved transversely of said plate, one being convex and the other concave on the same side of the plate.

2. The fishing spoon defined in claim 1 wherein the two transverse sectors are similarly curved longitudinally of the plate.

3. The fishing spoon defined in claim 1 wherein the four creases subtend longitudinal sectors of substantially equal angles and transverse sectors of substantially equal angles.

4. The fishing spoon defined in claim 3 wherein the angle between the creases of the longitudinal sections is substantially equal to the angle between the creases of the transverse sectors, being substantially a right angle.

5. A fishing spoon comprising a plate of oval shape adapted for attachment to a line at one end and to a hook at the opposite end, said plate having four creases radiating outward from its central portion to define four sectors, two of said sectors extending in opposite directions along the plate's longitudinal axis and the other two of said sectors extending in opposite directions transversely of the plate, the two creases bounding one of said longitudinal sectors forming valleys and the other two creases forming ridges on the same side of said plate, said two transverse sectors being similarly curved longitudinally of the plate, and said two longitudinal sectors being curved transversely of said plate, but one of the latter convexly and the other concavely on one side of the plate, said four creases being arranged substantially in right angle relationship one with respect to another to define four sectors of substantially ninety degrees each.

NIILO ERICKSON.

REFERENCES CITED

The following references are of record in the file of this patent:

UNITED STATES PATENTS

| Number | Name | Date |
|---|---|---|
| 1,770,003 | Miller | July 8, 1930 |
| 1,938,653 | Bardon | Dec. 12, 1933 |